No. 858,080. PATENTED JUNE 25, 1907.
F. B. LA MAY.
LOOKING GLASS HOLDER.
APPLICATION FILED OCT. 18, 1904.

WITNESSES:
Clarence W. Carroll.
D. Gurnee.

INVENTOR:
Frank B. La May
by Osgood & Davis
his Attys.

UNITED STATES PATENT OFFICE.

FRANK B. LA MAY, OF ROCHESTER, NEW YORK, ASSIGNOR TO CALDWELL MANUFACTURING COMPANY, OF ROCHESTER, NEW YORK, A CORPORATION OF NEW YORK.

LOOKING-GLASS HOLDER.

No. 858,080.  Specification of Letters Patent.  Patented June 25, 1907.

Application filed October 18, 1904. Serial No. 229,009.

*To all whom it may concern:*

Be it known that I, FRANK B. LA MAY, a citizen of the United States, and a resident of Rochester, in the county of Monroe and State of New York, have invented certain new and useful Improvements in Looking-Glass Holders, of which the following is a specification.

This invention relates to looking glass holders, and is particularly adapted for use with shaving glasses, or glasses that are to be held at different vertical and horizontal angles.

Figure 1:
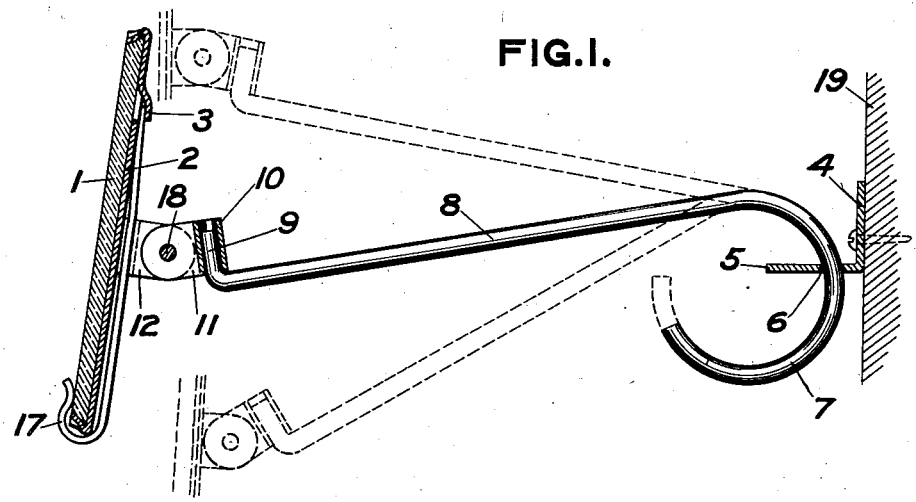
Figure 2:
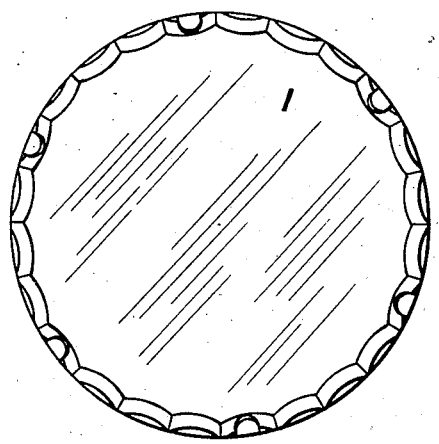
Figure 3:
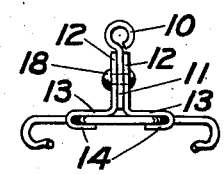
Figure 4:
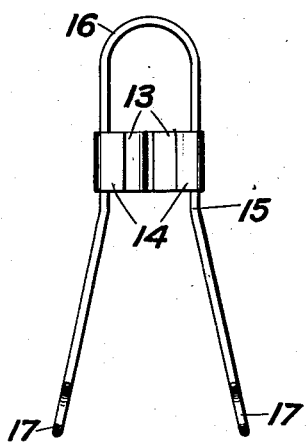
Figure 5:
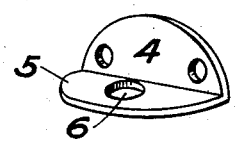

In the drawings:—Figure 1 is a view, partly in section and partly in side elevation, of a device embodying this invention, showing also in dotted lines two additional positions thereof; Fig. 2 is a front view of a mirror adapted to be held by the device shown in Fig. 1; Fig. 3 is a top plan view of the mirror carrier; Fig. 4 is a front elevation of a part of the mirror carrier; and Fig. 5 is a perspective view of the bracket.

In the drawings, 1 is a mirror having a metallic frame 2 suitably fastened to the mirror, and having a socket 3 in said frame for a purpose to be described. To a stationary support, such as a wall, is fastened a bracket 4 having a flange 5 provided with a perforation 6. In this perforation rests, loosely, the suitably curved end 7 of the supporting rod 8. The opposite end 9 of said rod is turned at right angles to the rod, and rests in a socket piece 10 of a hinge attached to the mirror carrier. This socket piece has a projecting flange 11 that rests between two flanged plates 12, which latter have the outwardly turned portions 13 and the recurved or hooked ends 14. Between these recurved or hooked ends rests a wire frame 15, having the curved top 16 and the lower ends flared and provided with hooks 17. The upper end 16 of the wire 15 constitutes a projection adapted to rest in the socket 3 in the mirror frame 2, and the lower edge of the mirror rests in the hook 17. The flanges 11 and 12 are fastened together by a pivot 18 to form the hinge.

This looking glass holder is capable of universal movement. The looking glass may be tipped at various angles, both on horizontal and vertical axes, and may also be raised and lowered by shifting the curved end 7 of the rod 8 in the bracket 5. It may also be swung horizontally, using the bracket 5 and the end 9 as pivots, and may thus lie substantially flat against the wall and out of the way.

What I claim is:—

1. The combination of a bracket, a rod carried thereby, a socket rotatable on the end of said rod, a mirror carrier having hooks at the lower end, a hinge connecting said carrier and said socket, and a mirror adapted to rest in said hooks.

2. The combination of a bracket, a rod carried thereby, a socket rotatable on the end of said rod, a mirror carrier having hooks at the lower end and a projection, a hinge connecting said carrier and said socket, and a mirror adapted to rest in said hooks and having a socket for the projection of said carrier.

3. The combination of a bracket, a rod carried thereby, a socket rotatable on the end of said rod, a mirror carrier consisting of a wire bent at the middle and having hooks at its ends, a hinged connection between said carrier and said socket, and a mirror adapted to rest in said hooks and having a socket for the bend in said wire.

4. The combination of a bracket, a rod carried thereby, a socket rotatable on the end of said rod, a mirror carrier consisting of a wire bent at the middle and having hooks at the ends, hooked plates engaging said wire, a hinged connection between said plates and said socket, and a mirror adapted to rest in the hooks of said wire and having a socket for the bend thereof.

FRANK B. LA MAY.

Witnesses:
D. GURNEE,
L. THON.